3,298,354
SHELL FISH CULTURE
Garrow T. Geer, Jr., Southampton, N.Y. (% Farr Whitlock Dixon & Co., Inc., 80 Pine St., New York, N.Y. 10005)
No Drawing. Filed July 27, 1965, Ser. No. 475,258
14 Claims. (Cl. 119—4)

This invention relates to the growing of shellfish and particularly bivalve mollusks such as oysters, clams, scallops, mussels, etc., and still more particularly to the development of the shells of the larvae and of these bivalves.

It is known that bivalves in the larvae stage are subject to attack by predators of various sorts because, among other factors, the larvae either have no shell, or extremely fragile shells. The larvae when they are spawned are microscopic in size and it is customary to grow them to at least approximately the size of a pinhead before distributing them as seed oysters. This is customarily done in a suitable water field containing a cultch such as a bed of old oyster shells. Such seed oysters attach themselves to the oyster shells and thus establish a permanent home. The growth of the larvae to pinhead or oyster seed size is recognized as a very considerable problem inasmuch as the larvae do not seem to have the ability to develop shells rapidly enough to prevent them from becoming to a large extent, the prey of various predators.

The purpose of the present invention is to enable the larvae to develop shells rapidly, and this is accomplished by providing a host water field which will enhance the shell growth.

In accordance with the invention there is introduced into the water field containing the bivalve larvae, a dust made from the shell of the particular bivalve. That is to say, when growing oyster larvae, the dust is made from oyster shells, when growing clam larvae, it is made from clam shells, and when growing scallop larvae, it is made from scallop shells etc. This dust is made by pulverizing the shell by a grinding operation, or otherwise, to a fineness such that the particle size is smaller than the particle size of the larvae. I have found that this can be accomplished by reducing the shell to a particle size which will pass through a 325 mesh screen. Oyster larvae will pass through a 230 mesh screen but will be retained on a 325 mesh screen.

Assuming for example, that oyster larvae are contained in an aquarium, tank or vat of sea water, this water will contain adequate food for the development of the bodies of the larvae but the development of their shells will be greatly delayed. In accordance with the invention, the shell dust which will pass through a 325 mesh screen is introduced into such body or field of water until, with agitation, the water becomes cloudy. After a period of from two to three hours, the cloudiness will disappear and the introduction of shell dust is repeated.

Periodical dusting operations are continued and within a period of approximately 9 to 14 days, depending upon the amount of food supplied, the larvae will have developed to setting size. The larvae can be used as seed oysters at this time, or if desired, the periodical dusting operations can be continued until oysters have grown to the size of one's thumbnail, at which time the shells will be more capable of resisting predators such as drills and starfish.

Advantageously the shell dust, which is an impalpable powder, is first mixed in any convenient manner with a small quantity of sea water so as to completely wet the dust. This mixture is then sprinkled onto the surface of the water in the tank or aquarium, or other water field. With slight agitation or stirring, the water will become cloudy as referred to previously.

When developing the larvae of clams, mussels or scallops, the procedure is similar to that described above except that a dust made from the shell of the particular bivalve is used. The exact function of the dust is not fully understood. It is believed however, that the larvae absorb the calcareous shell dust and that the bodily action of the larvae secretes the shell material.

Oyster larvae will absorb oyster shell dust and thrive upon it, and clam larvae will also absorb oyster shell dust, but it will kill the clam larvae.

Further aspects of the invention include employing the oyster shell dust on even mature oysters. Thus when oyster shell dust is introduced into a water field containing either immature or mature oysters, such as a "flat" or bay, the oysters will absorb this dust and have a tendency to emit a substance that is conducive to the growth of oyster larvae that may be present but hostile to the growth to any other larvae, thus providing a defense for the oyster bed.

As a specific example of the growing of oyster larvae in accordance with the invention, a vat 2½ feet in diameter and 3 feet high and containing approximately 30 gallons of sea water and several thousand oyster larvae, was used. Oyster shell dust was made by grinding oyster shells to a fineness such that the dust would pass through a 325 mesh screen. About three ounces of this dust was stirred into about one quart of sea water and then this mixture was sprinkled onto the surface of the water in the vat until, aided by stirring, the water became cloudy.

After from two to three hours, this cloudiness disappeared. The surface of the water was again sprinkled with a similar amount of the dust and water mixture. This was repeated periodically until the oyster larvae grew to approximately pinhead size, which required about three weeks. The introduction of the dust and sea water mixture at regular intervals was continued, and in two-and-one-half months, the oysters had grown from pinhead size to thumbnail size and had rugged shells.

I claim:
1. The method of enhancing the growth of the shells of bivalve mollusk larvae which comprises admixing with a body of water containing such larvae a dust made from the shell of the particular bivalve.
2. The method as set forth in claim 1 in which the shell dust has a particle size which is smaller than the bivalve larvae.
3. The method as set forth in claim 1 in which the shell dust has a particle size which will pass through a 325 mesh screen.
4. The method of enhancing the growth of the shells of bivalve mollusk larvae which comprises admixing with a body of water containing such larvae a dust made from the shell of the particular bivalve and in sufficient quantity to render the water cloudy and repeating such admixing at intervals so as to maintain the water in a cloudy condition.
5. The method as set forth in claim 4 in which the shell dust has a particle size which is smaller than the bivalve larvae.
6. The method as set forth in claim 4 in which the shell dust has a particle size which will pass through a 325 mesh screen.
7. The method of enhancing the growth of the shell of oyster larvae which comprises admixing with a body of water containing oyster larvae, a dust made by pulverizing oyster shells.
8. The method as set forth in claim 7 in which the oyster shell dust has a particle size which is smaller than the oyster larvae.

9. The method as set forth in claim 8 in which the oyster shell dust has a particle size which will pass through a 325 mesh screen.

10. The method of enhancing the growth of the shell of oyster larvae which comprises admixing with a body of sea water containing oyster larvae, oyster shell dust in sufficient quantity to render the water cloudy and repeating such admixing at intervals so as to maintain the water in a cloudy condition.

11. A method as set forth in claim 10 in which the oyster shell dust has a particle size which is smaller than the oyster larvae.

12. The method as set forth in claim 10 in which the oyster shell dust has a particle size which will pass through a 325 mesh screen.

13. The method of enhancing the growth of the shells of bivalve mollusks which comprises introducing into a natural water field containing the bivalves a dust made from the shells of the bivalve mollusk.

14. The method of enhancing the growth of the shell of oysters which comprises introducing into a natural water field containing the oysters, a dust made from oyster shells having a particle size which will pass through a 325 mesh screen.

References Cited by the Examiner
UNITED STATES PATENTS 2,853,049   9/1958   Glancy _____ 119—4
3,196,833   7/1965   Glancy _____ 119—4

SAMUEL KOREN, *Primary Examiner.*

ALDRICH F. MEDBERY, *Examiner.*